Figure 1:
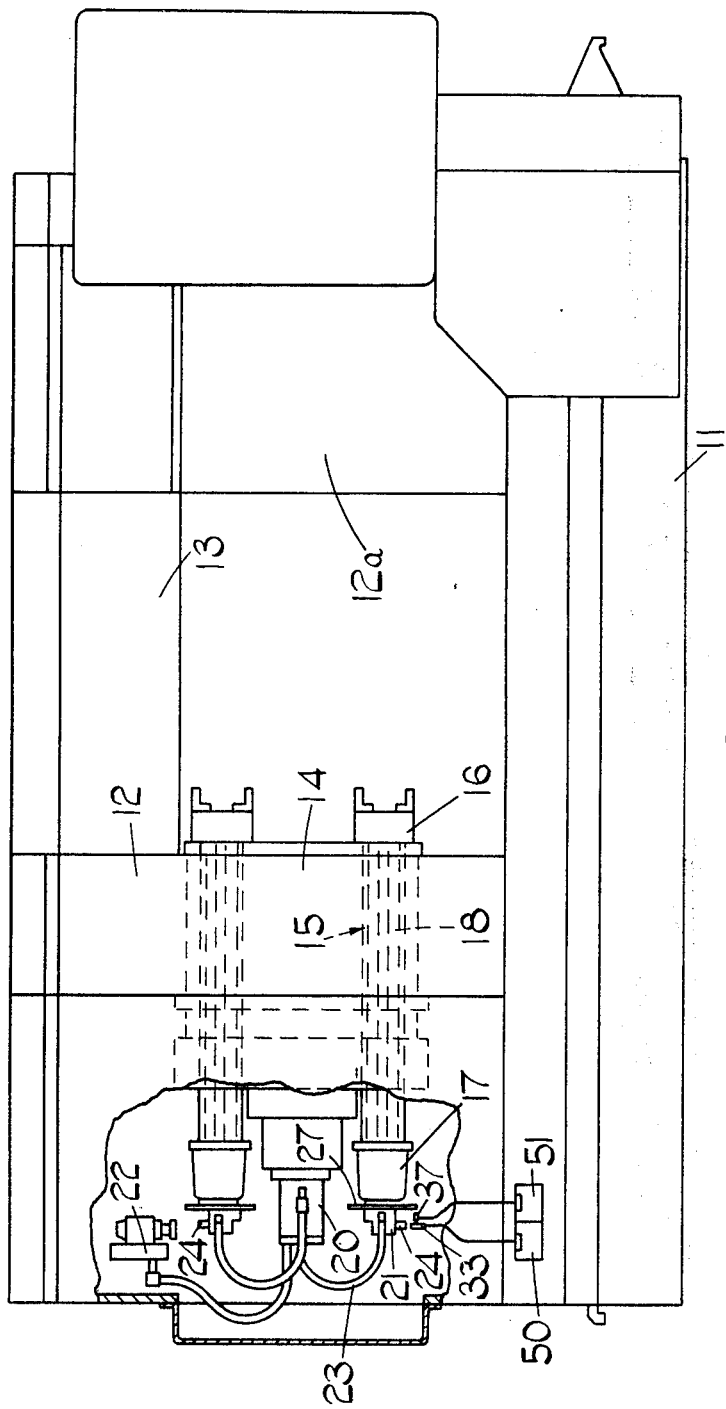

United States Patent [19]

Gilbert, deceased et al.

[11] 4,008,635
[45] Feb. 22, 1977

[54] MULTI SPINDLE LATHES

[75] Inventors: Harold James Gilbert, deceased, late of Coventry, England, by Olive Gertrude Gilbert, executrix; Edmund Alexander McConnell, Coventry, England

[73] Assignee: Wickman Machine Tool Sales Limited, Coventry, England

[22] Filed: Sept. 3, 1975

[21] Appl. No.: 610,072

[30] Foreign Application Priority Data

Sept. 12, 1974 United Kingdom ............ 39744/74

[52] U.S. Cl. .................................... 82/30; 82/3; 82/28 B; 82/DIG. 7
[51] Int. Cl.[2] .................... B23B 19/02; B23B 3/34
[58] Field of Search ................ 82/3, 34 R, DIG. 7, 82/28 B, 30

[56] References Cited

UNITED STATES PATENTS

| | | | |
|---|---|---|---|
| 2,338,305 | 1/1944 | Simmon | 82/DIG. 7 |
| 2,390,978 | 12/1945 | Woodbury | 82/DIG. 7 |
| 2,702,609 | 2/1955 | Frazier et al. | 82/DIG. 7 |

*Primary Examiner*—Harrison L. Hinson
*Attorney, Agent, or Firm*—Finnegan, Henderson, Farabow & Garrett

[57] ABSTRACT

A multi spindle lathe having a drum with a number of rotatable work spindles therein, the spindles having respective chucks thereon, and each spindle carrying a gapped ring adjacent to which is a proximity switch probe with control means which ensures that the chuck cannot be operated unless the spindle speed is below a predetermined low value, which is determined by the signal pulse frequency from said switch.

3 Claims, 3 Drawing Figures

MULTI SPINDLE LATHES

This invention relates to multi spindle lathes which include a drum, in which are rotatably mounted a number of work spindles, the drum being indexable to bring work spindles to successive positions or stations at which tools can act upon workpieces which are held in chucks on the respective spindles, to carry out machining operations. At one or more of the stations, the spindles must be stopped, either in order that loading and unloading operations may be carried out, or so that an operation such as cross drilling may take place.

In multi spindle lathes of this kind, it is important that a workpiece must not be released or a cross drilling or similar operation must not commence before the spindle in the appropriate station, has actually come to rest. This is to avoid the workpiece being prematurely released or to prevent tool breakage. It will be appreciated that it is quite possible for such operations to commence if the brake for stopping the spindle fails to operate properly.

It is the object of this invention to provide a multi spindle lathe having means for indicating whether a spindle which should have come to rest, has effectively done so.

According to the present invention a multi spindle lathe is characterised by switch means operatively associated with a gapped ring mounted for rotation with a spindle to be monitored, said switch receiving signal pulses produced in response to rotation of the spindle, said signal pulse frequency changing as the spindle slows on braking at least until the time interval between signal pulses exceeds a predetermined time.

Figure 2:
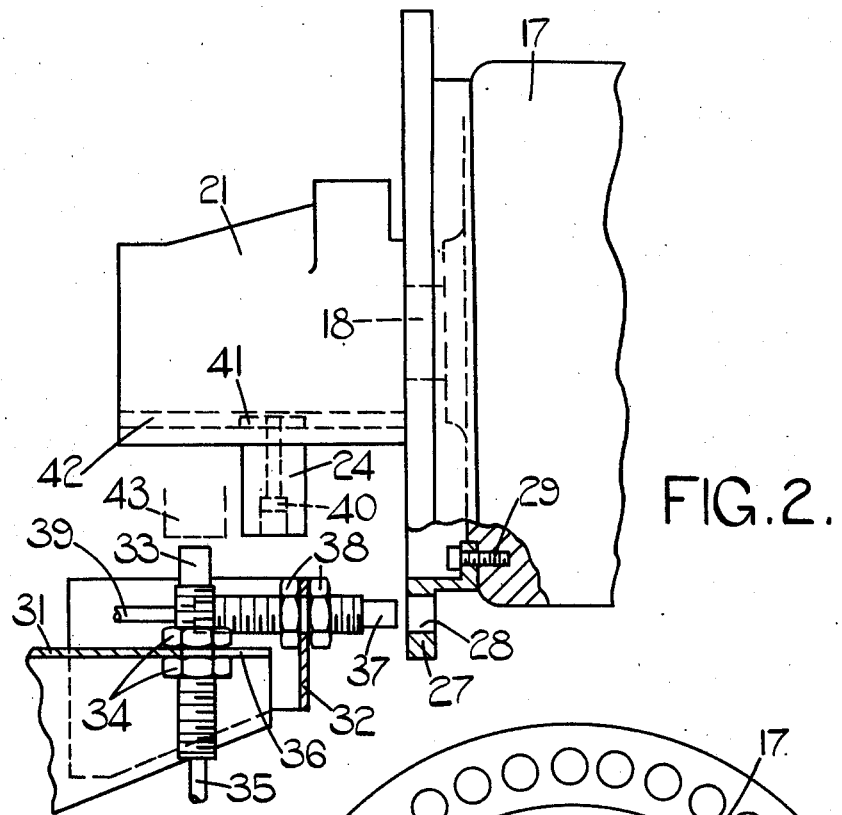
Figure 3:
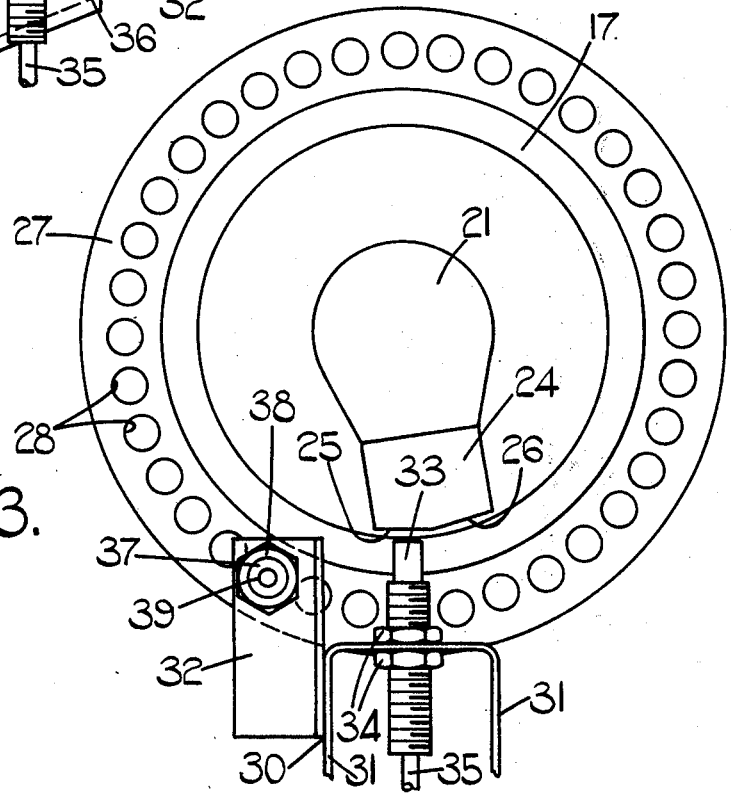

The invention will now be described by way of example with reference to the accompanying drawings in which:

FIG. 1 is a side elevation view of a lathe constructed in accordance with the invention, part of the casing of the lathe being cut away for clarity, FIG. 2 is an enlarged cross sectional side elevation view of that portion of the lathe to which the invention applies and, FIG. 3 is an end elevation view of the parts shown in FIG. 2.

In FIG. 1 the lathe is shown comprising a base 11 on which is mounted a superstructure 12 connected to a further superstructure 12a by a bridge 13. Rotatably mounted in the superstructure about a horizontal axis is a spindle drum 14 in which are mounted a number of independently rotatable work spindles indicated generally at 15. Each such work spindle carries a chuck 16 which can be opened and closed to grip workpieces either internally or externally.

To actuate the chucks 16 each spindle 15 carries at its end remote from the chuck a hydraulic piston and cylinder unit 17. In the example shown these units are of the kind in which hydraulic pressure is maintained to prevent relaxing of the chuck even in the event of failure of the applied hydraulic pressure. The cylinders 17 actuate the respective chucks 16 through rods 18 passing through the centres of the spindles 15 respectively.

In the centre of the drum also at its end remote from the chucks 16 is a rotary distributor 20 from which supply pipes lead to respective rotary couplings 21. Each such rotary coupling 21 is mounted on the extremity of the rod 18 which is also connected to the piston within the piston and cylinder unit 17.

The distributor 20 is connected to a valve block 22 on which are mounted a series of valves arranged to control actuation of the cylinders in accordance with a predetermined cycle of the machine.

The valve block 22 and associated distributor and rotary couplings 20 and 21 are fully described in the specification of co-pending U.S. patent application Ser. No. 610,913, filed Sept. 8, 1975 by E. A. McConnell.

Each rotary coupling has a stationary casing portion to which supply pipes 23 from the distributor 20 are connected and the casing portion has mounted on it a block 24. These blocks are presented outwardly of the pitch circle on which the work spindles 15 are arranged. Furthermore the externally presented surface of each block 24 is shaped with two shallowly inclined planes 25, 26 as shown in FIG. 3.

Mounted on the end of each of the cylinders 17 is a gapped ring 27 (FIGS. 2 and 3) having a number of holes 28 in a flange thereof forming a series of gaps therein. The holes are axial and therefore present open ends in a direction generally towards the rotary coupling 21, but the ring has a larger diameter than the outside dimensions of that coupling 21. Screws 29 secure the ring onto the cylinder 17 as shown in FIG. 2.

Arranged adjacent to one or more than one of the spindle stations and secured on a fixed part of the machine is a bracket assembly 30, comprising a U-shaped part 31 and generally L-shaped part 32. The U-shaped part 31 carries on the base of the U an adjustable probe 33, forming part of a proximity switch. The probe may be, for example, a magnetic reluctance sensor. For adjusting the probe 33 in the bracket 31 the probe has a screw threaded portion engaging a pair of lock nuts 34 engaging on opposite sides of the base of the U respectively. The probe 33 has a connecting line 35 leading to a control device 50 (FIG. 1). The probe 33 is adjustable lengthwise of the bracket 31 as it is mounted in a slot 36 therein as shown in FIG. 2.

On the L-shaped bracket 32 there is carried another probe 37, of a further proximity switch similarly adjustably connected by means of lock nuts 38 to the bracket 32. A further connecting line 39 is provided for the probe 37 and is connected to a further control device 51 (FIG. 1). The probes 33 and 37 are presented in mutually perpendicular directions, the probe 33 being presented towards the blocks 24 on the rotary couplings 21, and the probe 37 being presented towards the holes 28 in the flange of the ring 27 on the cylinder for the time being in the appropriate work spindle station.

The blocks 24 are adjustable lengthwise of the rotary couplings 21 by means of screws 40 engaging in respective nuts 41 which in turn locate in slots 42 in the rotary couplings 21 respectively.

The proximity switches associated with the two probes 33 and 37 at a particular station, are connected in control circuits of the control device so as to operate as follows.

The Probe 33 is arranged to monitor the axial position of the rotary coupling 21 of a spindle for the time being in the appropriate work station. If the chuck on that spindle is open the block 24 will occupy a position shown in full lines in FIG. 2. If however the chuck is closed upon a work piece in external gripping mode, the block 24 will occupy a position indicated in dotted lines at 43 in FIG. 2 where it is close to the proximity switch probe 33. In this position the switch detects the presence of the block 24 and provides a signal to the control device 50 which in turn operates a relay in the electrical circuit allowing the next part of the machine cycle to proceed.

It is however to be understood that where internal gripping of a component by means of the chuck is required the rotary coupling 21 moves in the opposite direction. Thus when the chuck is open, block 24 is on the opposite side of position 43 shown in FIG. 2.

It is further possible for the probe 33 to sense when over-travel of the chuck has taken place, since the block will travel passed its appointed position. This allows the control device to cancel the previous signal and stop the machine. This avoids broken tooling or other accidents, if the chuck fails to grip a workpiece in the correct manner.

The probe 37 is used to determine whether a spindle, which should have come to rest after applying the brake, has in fact done so. The proximity switch associated with the probe 37 receives signal pulses from the probe related to the frequency of passage of the holes 28 past the probe. The control device 51 associated with the proximity switch is so arranged that when no signal pulses have been received after a predetermined time interval, thus indicating that the spindle has stopped, a relay will be operated in the electrical circuit allowing the next part of the machine cycle to proceed. The connections between the control devices 50, 51 and the machine operating controls are not illustrated.

With this apparatus, safety measures are provided for ensuring against commencement of a cross drilling operation, or loading or unloading operation before the chuck is closed on a component and before the spindle has ceased rotating following a previous operation.

The switches may be provided on more than one of the spindle stations according to machining requirements.

The inventive aspects of the portion of the system including probe 33 and blocks 24 are claimed in our copending application Ser. No. 610,073, filed Sept. 3, 1975.

We claim:

1. In a control system for an automatic lathe the combination comprising:
    a gapped ring mounted for rotation with a spindle of said lathe, said ring having a plurality of gaps arranged to follow a circular path as said ring rotates;
    a proximity probe positioned adjacent to said circular path and adapted to produce signal pulses in response to passage of said gaps, said pulses being generated without contact between said ring and said probe; and
    control means responsive to said signal pulses for inhibiting predetermined functions of said lathe so long as the time between successive ones of said signal pulses is less than a predetermined interval.

2. The system set forth in claim 1 further comprising mounting means for said probe constructed and arranged to permit adjustment of said probe toward or away from said gapped ring.

3. The system set forth in claim 1 wherein the gaps in said gapped ring comprise a plurality of holes provided adjacent to a peripheral portion of said ring and aligned along axes paralled to the axis of rotation of said spindle.

* * * * *